United States Patent
Nakakura et al.

(10) Patent No.: US 9,593,727 B1
(45) Date of Patent: Mar. 14, 2017

(54) BICYCLE DISC BRAKE ROTOR

(71) Applicant: Shimano Inc., Sakai, Osaka (JP)

(72) Inventors: Masahiro Nakakura, Osaka (JP); Yusuke Hosomi, Osaka (JP); Ryosuke Yamamoto, Osaka (JP); Masanori Taniguchi, Osaka (JP); Toru Iwai, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/876,324

(22) Filed: Oct. 6, 2015

(51) Int. Cl.
*F16D 65/12* (2006.01)
*F16D 65/02* (2006.01)

(52) U.S. Cl.
CPC ......... *F16D 65/128* (2013.01); *F16D 65/125* (2013.01); *F16D 65/123* (2013.01); *F16D 2065/1316* (2013.01); *F16D 2065/1332* (2013.01); *F16D 2200/003* (2013.01); *F16D 2200/0017* (2013.01); *F16D 2200/0021* (2013.01); *F16D 2250/0061* (2013.01)

(58) Field of Classification Search
CPC .......... B62L 1/005; B23P 15/00; F16D 65/12; F16D 65/122
USPC ........ 188/18 A, 26, 218 XL, 264 A, 264 AA
See application file for complete search history.

(56) References Cited

U.S. PATENT DOCUMENTS

| | | | |
|---|---|---|---|
| 2005/0006186 A1* | 1/2005 | Iwai | B62L 1/005 188/26 |
| 2006/0037819 A1* | 2/2006 | Takizawa | B62L 1/005 188/26 |
| 2008/0060891 A1* | 3/2008 | Chen | F16D 65/122 188/218 XL |
| 2011/0056777 A1* | 3/2011 | Woychowski | F16D 65/12 188/218 XL |
| 2013/0075207 A1* | 3/2013 | Bruntz | B23P 15/00 188/218 XL |
| 2013/0168193 A1* | 7/2013 | Iwai | F16D 65/12 188/218 XL |
| 2015/0345579 A1* | 12/2015 | Iwai | F16D 65/12 188/26 |

* cited by examiner

*Primary Examiner* — Christopher Schwartz
(74) *Attorney, Agent, or Firm* — Global IP Counselors (57) ABSTRACT

A bicycle disc brake rotor having a rotational center axis is provided including an outer portion and an inner portion. The outer portion includes a first member having a first thermal conductivity and a second member having a second thermal conductivity that is higher than the first thermal conductivity. The second member is attached to the first member. The inner portion is disposed radially inwardly from the outer portion with respect to the rotational center axis. The inner portion is a separate member from the first and second members. The inner portion is attached to or contacts the second member of the outer portion.

30 Claims, 10 Drawing Sheets

BICYCLE DISC BRAKE ROTOR

BACKGROUND OF THE INVENTION

Field of the Invention

The present invention generally relates to a bicycle disc brake rotor. More specifically, the present invention relates to a bicycle disc brake rotor with a configuration that promotes cooling of the braking surfaces.

Background Information

In recent years, some bicycles have been provided with disc brakes. Disc brake systems provide a substantial braking power in relationship to the amount of braking force applied to the brake lever. Also, disc brake systems typically provide a high level of consistency in all types of weather and riding conditions. Disc brake systems typically include a caliper housing, a first movable brake pad and a second fixed or movable brake pad. Disc brakes can be hydraulically actuated or mechanically actuated for moving the movable brake pad(s). The brake pads are positioned on either side of a rotor, which is attached to the front or rear wheel of a bicycle. The brake pads are pressed against a brake disc or rotor that is fixed to the wheel to slow down or stop the rotation of the disc, and thus, slow down or stop the rotation of the wheel.

SUMMARY OF THE INVENTION

In view of the state of the known technology and in accordance with a first aspect of the present invention, a bicycle disc brake rotor having a rotational center axis is provided including an outer portion and an inner portion. The outer portion includes a first member having a first thermal conductivity and a second member having a second thermal conductivity that is higher than the first thermal conductivity. The second member is attached to the first member. The inner portion is disposed radially inwardly from the outer portion with respect to the rotational center axis. The inner portion is a separate member from the first and second members. The inner portion is attached to the second member of the outer portion.

In accordance with a second aspect of the present invention, the bicycle disc brake rotor according to the first aspect is configured such that a radial length of the second member is longer than a radial length of the first member.

In accordance with a third aspect of the present invention, the bicycle disc brake rotor according to the first aspect is configured such that the outer portion further includes a third member. The second member is attached to the third member and is disposed between the first member and the third member in an axial direction parallel to the rotational center axis.

In accordance with a fourth aspect of the present invention, the bicycle disc brake rotor according to the third aspect is configured such that a radial length of the first member is longer than a radial length of the third member.

In accordance with a fifth aspect of the present invention, the bicycle disc brake rotor according to the third aspect is configured such that the inner portion is axially spaced from the third member.

In accordance with a sixth aspect of the present invention, the bicycle disc brake rotor according to the first aspect is configured such that the inner portion is attached to the second member by at least one of the group consisting of bonding, welding, an adhesive and a mechanical fastener.

In accordance with a seventh aspect of the present invention, the bicycle disc brake rotor according to the first aspect is configured such that a cooling fin is attached to the inner portion.

In accordance with an eighth aspect of the present invention, the bicycle disc brake rotor according to the first aspect is configured such that a cooling fin is attached at least to the second member of the outer portion.

In accordance with a ninth aspect of the present invention, the bicycle disc brake rotor according to the third aspect is configured such that a plurality of openings are formed in the third member to expose a base surface of the second member.

In accordance with a tenth aspect of the present invention, the bicycle disc brake rotor according to the first aspect is configured such that the first member has a radial length substantially equal to a radial length of the second member.

In accordance with an eleventh aspect of the present invention, the bicycle disc brake rotor according to the third aspect is configured such that a plurality of recessed portions are formed in an inner peripheral edge of the third member to expose a base surface of the second member.

In accordance with a twelfth aspect of the present invention, the bicycle disc brake rotor according to the first aspect is configured such that the inner portion includes a hub attachment part configured to be attached to a bicycle hub assembly.

In accordance with a thirteenth aspect of the present invention, the bicycle disc brake rotor according to the twelfth aspect is configured such that the inner portion includes at least one arm portion. The at least one arm portion extends radially outwardly from the hub attachment part to the outer portion with respect to the rotational center axis.

In accordance with a fourteenth aspect of the present invention, the bicycle disc brake rotor according to the thirteenth aspect is configured such that the at least one arm portion includes an attachment portion configured to be attached to the second member of the outer portion.

In accordance with a fifteenth aspect of the present invention, the bicycle disc brake rotor according to the fifteenth aspect is configured such that a plurality of openings extend entirely through the outer portion.

In accordance with a sixteenth aspect of the present invention, a bicycle disc brake rotor having a rotational center axis is provided including an outer portion and an inner portion. The outer portion includes a first member having a first thermal conductivity and a second member having a second thermal conductivity that is higher than the first thermal conductivity. The second member is attached to the first member. The inner portion is disposed radially inwardly from the outer portion with respect to the rotational center axis. The inner portion is a separate member from the first and second members. The inner portion contacts the second member of the outer portion.

In accordance with a seventeenth aspect of the present invention, the bicycle disc brake rotor according to the sixteenth aspect is configured such that the inner portion is attached to the first member of the outer portion.

In accordance with an eighteenth aspect of the present invention, the bicycle disc brake rotor according to the seventeenth aspect is configured such that the inner portion is attached to the first member by at least one of the group consisting of bonding, welding and an adhesive.

In accordance with a nineteenth aspect of the present invention, the bicycle disc brake rotor according to the sixteenth aspect is configured such that a radial length of the second member is longer than a radial length of the first member.

In accordance with a twentieth aspect of the present invention, the bicycle disc brake rotor according to the sixteenth aspect is configured such that a cooling fin is attached to the inner portion.

In accordance with a twenty-first aspect of the present invention, the bicycle disc brake rotor according to the sixteenth aspect is configured such that a cooling fin is attached to at least the second member of the outer portion.

In accordance with a twenty-second aspect of the present invention, the bicycle disc brake rotor according to the sixteenth aspect is configured such that the inner portion is axially spaced from the first member.

In accordance with a twenty-third aspect of the present invention, the bicycle disc brake rotor according to the sixteenth aspect is configured such that the outer portion further includes a third member. The second member is attached to the third member and is disposed between the first member and the third member in an axial direction parallel to the rotational center axis.

In accordance with a twenty-fourth aspect of the present invention, the bicycle disc brake rotor according to the twenty-third aspect is configured such that a plurality of openings are formed in the third member to expose a base surface of the second member.

In accordance with a twenty-fifth aspect of the present invention, the bicycle disc brake rotor according to the sixteenth aspect is configured such that the first member has a radial length substantially equal to a radial length of the second member.

In accordance with a twenty-sixth aspect of the present invention, the bicycle disc brake rotor according to the twenty-third aspect is configured such that a plurality of recessed portions are formed in an inner peripheral edge of the third member to expose a base surface of the second member.

In accordance with a twenty-seventh aspect of the present invention, the bicycle disc brake rotor according to the sixteenth aspect is configured such that the inner portion includes a hub attachment part configured to be attached to a bicycle hub assembly.

In accordance with a twenty-eighth aspect of the present invention, the bicycle disc brake rotor according to the twenty-seventh aspect is configured such that the inner portion includes at least one arm portion. The at least one arm portion extends radially outwardly from the hub attachment part to the outer portion with respect to the rotational center axis.

In accordance with a twenty-ninth aspect of the present invention, the bicycle disc brake rotor according to the twenty-eighth aspect is configured such that the at least one arm portion includes an attachment area configured to be attached to the first member of the outer portion.

In accordance with a thirtieth aspect of the present invention, the bicycle disc brake rotor according to the twenty-third aspect is configured such that a plurality of openings extend entirely through the outer portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments of the present invention will now be explained with reference to the drawings. It will be apparent to those skilled in the art from this disclosure that the following descriptions of the exemplary embodiments of the present invention are provided for illustration only and not for the purpose of limiting the invention as defined by the appended claims and their equivalents.

Figure 1:
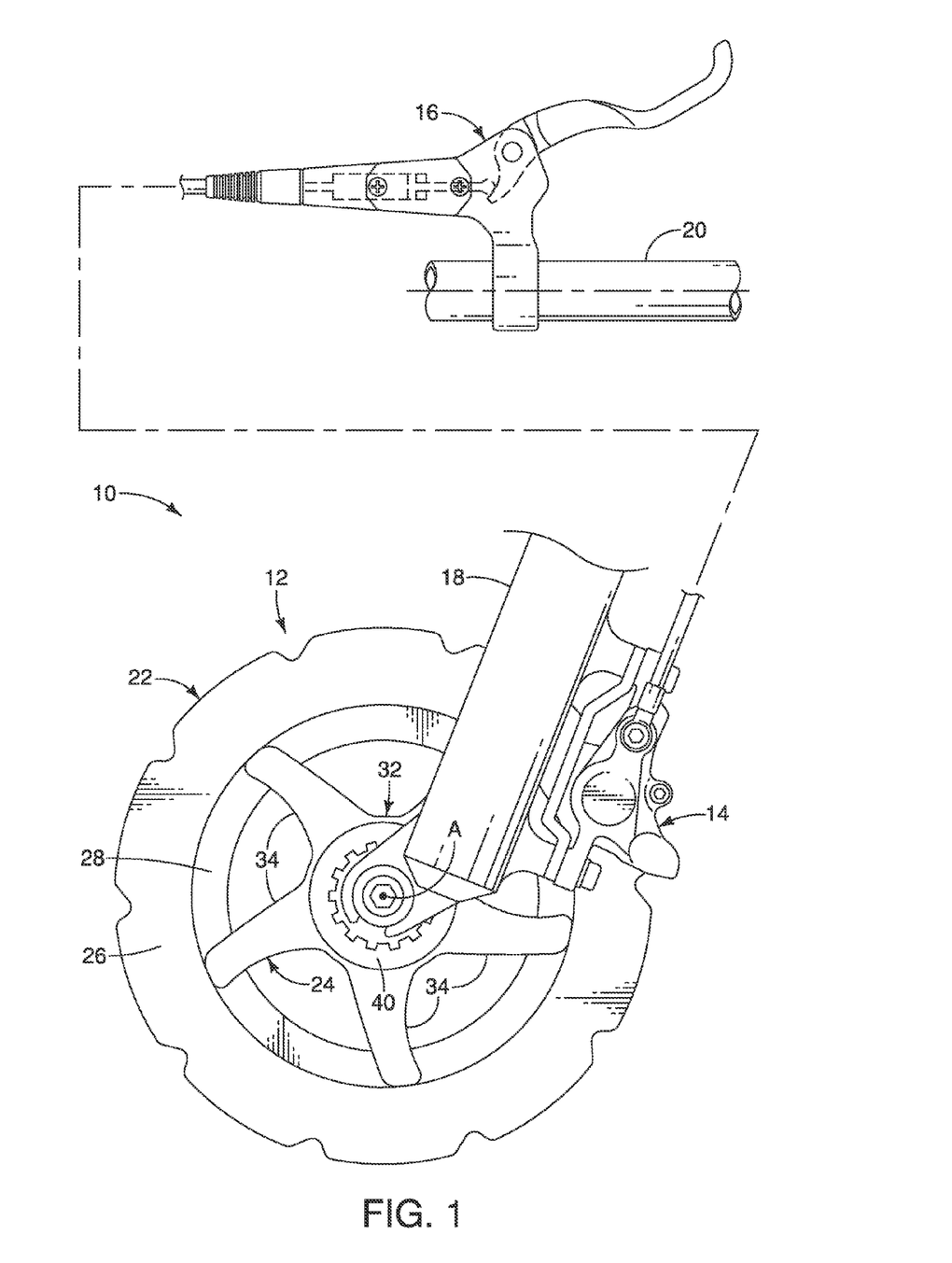
FIG. 1 is a partial side elevational view of a front disc brake system including a bicycle disc brake rotor in accordance with a first exemplary embodiment.

Referring initially to FIG. 1, a front disc brake system 10 is illustrated that includes a bicycle disc brake rotor 12 in accordance with a first exemplary embodiment. As explained below, the bicycle disc brake rotor 12 has a configuration that promotes cooling of the bicycle disc brake rotor 12. The bicycle disc brake rotor has a rotational center axis A. The front disc brake system 10 further includes a bicycle disc brake caliper 14 and a bicycle brake operating (actuating) mechanism 16. Basically, the bicycle disc brake rotor 12 is fixedly attached to a hub assembly of a bicycle wheel (not shown). The bicycle disc brake caliper 14 is mounted to a bicycle front fork 18, while the brake operating mechanism 16 is attached to a bicycle handlebar 20. Because the operation and construction of the front disc brake system 10 are conventional, except for the construction of the bicycle disc brake rotor 12, the front disc brake system 10 will not be discussed or shown in further detail herein. Moreover, while the front disc brake system 10 is illustrated as a hydraulic braking system, the bicycle disc brake rotor 12 can be used with other types of braking systems as needed and/or desired.

The disc brake caliper 14 is constructed for selectively gripping (stopping rotation) of the bicycle disc brake rotor 12 to stop or slow the rotation of a bicycle wheel (not shown). During this braking operation, heat is generated that is transferred to the bicycle disc brake rotor 12 and the bicycle disc brake caliper 14. As explained below, the bicycle disc brake rotor 12 is designed to dissipate the heat generated during braking.

Figure 2:
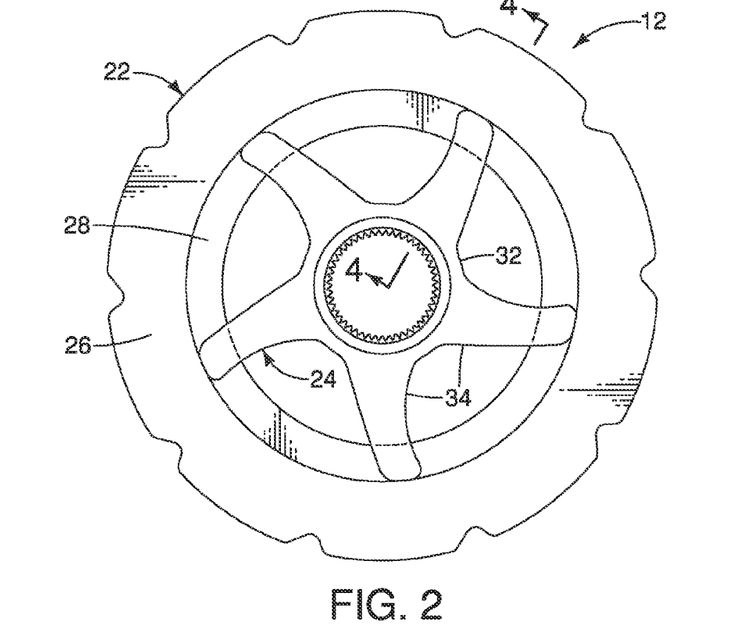
FIG. 2 is a side elevational view of the disc brake rotor illustrated in FIG. 1.
Figure 3:
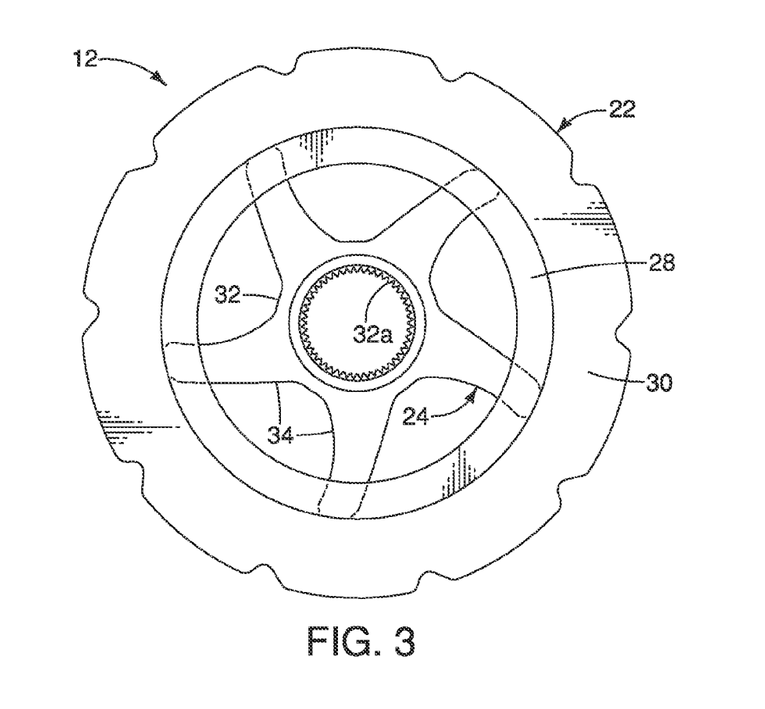
FIG. 3 is an opposite side elevational view of the disc brake rotor illustrated in FIG. 1.
Figure 4:
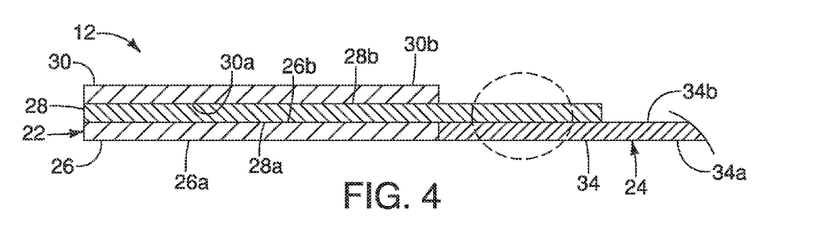
FIG. 4 is a cross sectional view of the bicycle disc brake rotor taken along line 4-4 of FIG. 2.

Referring now to FIGS. 2 to 4, the bicycle disc brake rotor 12 includes an outer portion 22 and an inner portion 24. The outer portion 22 includes a first member 26 and a second member 28 attached to the first member 26. The first and second members 26 and 28 are attached in any suitable manner, such as being bonded by welding or brazing. By making the first and second members 26 and 28 separate members that are secured together, the materials of the first and second members 26 and 28 can be different. For example, the first member 26 has a first thermal conductivity and the second member 28 has a second thermal conductivity that is higher than the first thermal conductivity. The first member 26 is preferably made of a material with corrosion resistant characteristics that is suitable for brake pad contact, such as stainless steel or other suitable material. The second member 28 is preferably made of a metallic material with corrosion resistant characteristics, such as an aluminum alloy or other suitable material.

The outer portion 22 further includes a third member 30 attached to the second member 28, as shown in FIGS. 3 and 4. The second and third members 28 and 30 are attached in any suitable manner, such as being bonded by welding or brazing. By making the second and third members 28 and 30 separate members that are secured together, the materials of the second and third members 28 and 30 can be different. For example, the third member 30 has a third thermal conductivity that is less than the second thermal conductivity of the second member 28. The third member 30 is preferably made of a material with corrosion resistant characteristics that is suitable for brake pad contact, such as stainless steel or other suitable material. More preferably, the first and third members 26 and 30 are made of the same material.

The first member 26 has a first surface 26a and an oppositely disposed second surface 26b, as seen in FIG. 4. The first and second surfaces 26a and 26b of the first member 26 face in opposite axial directions of the bicycle disc brake rotor 12. The first surface 26a faces axially outwardly to form a first braking surface of the bicycle disc brake rotor 12. The second surface 26b faces axially inwardly and is adjacent and attached to a first surface 28a of the second member 28. A second surface 28b of the second member 28 is disposed adjacent and attached to a first surface 30a of the third member 30. The first and second surfaces 28a and 28b of the second member 28 face in opposite axial directions of the bicycle disc brake rotor 12. A second surface 30b of the third member 30 is oppositely disposed the first surface 30a to face outwardly to form a second braking surface of the bicycle disc brake rotor 12. The second member 28 is disposed between the first and third members 26 and 30 in an axial direction parallel to the rotational center axis A of the bicycle disc brake rotor 12. The first and second surfaces 30a and 30b of the third member 30 face in opposite axial directions of the bicycle disc brake rotor 12. The first surface 26a of the first member 26 and the second surface 30b of the third member are the outermost surfaces of the bicycle disc brake rotor, as seen in FIG. 4, and form the first and second braking surfaces, respectively.

As seen in FIG. 4, the second member 28 extends radially inwardly further than the first and second members 26 and 30, such that a radial length of the second member 28 is longer than a radial length of each of the first and third members 26 and 30, thereby exposing a portion of each of the first and second surfaces 28a and 28b of the second member 28. The first member 26 has a radial length that is substantially equal to a radial length of the third member 30. Alternatively, the first member 26 can have a radial length longer than a radial length of the third member 30.

The inner portion 24 of the bicycle disc brake rotor 12 includes a hub attachment part 32 and at least one connecting arm, or arm portion, 34 extending radially outwardly from the hub attachment part 32 to the outer portion 22 with respect to the rotational center axis A, as seen in FIGS. 1-3. As seen in FIGS. 2 and 3, five connecting arms 34 extend radially outward from the hub attachment part 32, although any suitable number of connecting arms can be used. The hub attachment part 32 is configured to be attached to a bicycle hub assembly, as seen in FIG. 1. The inner portion 24 is disposed radially inwardly from the outer portion 22 with respect to the rotational center axis A of the bicycle disc brake rotor 12. Each connecting arm 34 has a first surface 34a and a second surface 34b that face in axially opposite directions. The hub attachment part 32 is coupled to inner ends of the connecting arms 34. The hub attachment part 32 and the connecting arms 34 are preferably integrally formed as a one-piece member of a suitable material, such as an aluminum alloy or other lightweight material. Alternatively, the inner ends of the connecting arms 34 can be formed as separate pieces that are attached to the hub attachment part 32 in any suitable manner, such as by fasteners.

The hub attachment part 32 is preferably integrally formed at inner ends of the connecting arms 34 as a one-piece member. The hub attachment part 32 includes a mounting opening with splines 32a for accommodating a hub axle of a bicycle hub assembly therethrough, as seen in FIGS. 1 and 3. The hub attachment part 32 is mounted to the bicycle hub assembly by a locking ring 40, as seen in FIG. 1. Thus, the bicycle disc brake rotor 12 rotates with the bicycle hub about the rotational center axis A of the bicycle disc brake rotor 12.

The inner portion 24 is a separate member from the first, second and third members 26, 28 and 30, respectively, of the outer portion 22. As seen in FIGS. 2-4, the inner portion 24 can either be attached to the first member 26 or to the second member 28 of the outer portion 22. The inner portion 24 is axially spaced from the third member 30. The connecting arm 34 includes an attachment area configured to be attached to the first member 26 or to the second member 28 of the outer portion 22.

The attachment area of the connecting arm 34 can be attached to an inner peripheral end of the first member 26 such that the inner portion 24 contacts the second member 26 of the outer portion 22. As seen in FIG. 4, the second surface 34b of the contact arm 24 of the inner portion 24 contacts a first surface 28a of the second member 28 of the outer portion 22. The inner portion 24 is attached to the first member 26 of the outer portion 22 in any suitable manner, such as by bonding, welding, or an adhesive.

Figure 5:
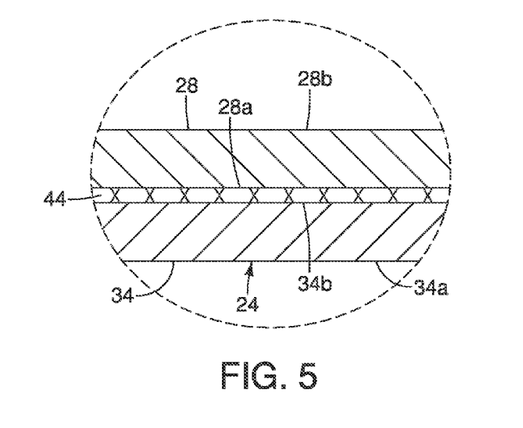
FIG. 5 is an exploded cross sectional view illustrating an adhesive layer between an inner portion and an outer portion of the bicycle disc brake rotor.
Figure 7:
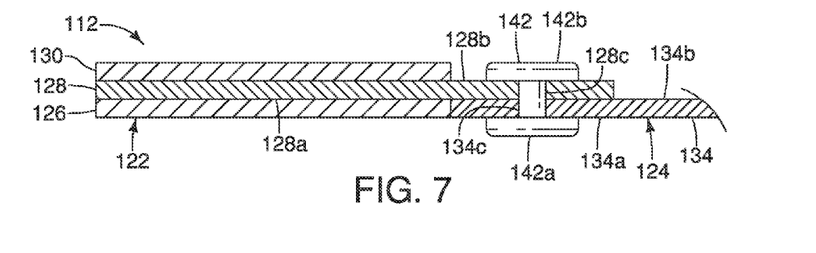
FIG. 7 is a cross sectional view of the bicycle disc brake rotor in accordance with a second exemplary embodiment in which an inner portion is attached to an outer portion with a fastener.

Alternatively, the attachment area of the connecting arm 34 of the inner portion 24 is attached to the first surface 28a of the second member 28 in any suitable manner, such as by bonding, welding, brazing, an adhesive or a mechanical fastener (as seen in FIG. 7, for example). As seen in FIG. 5, for example, an adhesive layer 44 is disposed between the second surface 34b of the connecting arm 34 of the inner portion 24 and the first surface 28a of the second member 28 of the outer portion 22 to attach the inner portion 24 to the second member 28 of the outer portion 22. Because the inner portion 22 and the second member 28 are formed as separate members, the inner portion 22 and the second member 28 can be made of different materials, such as different compositions of an aluminum alloy.

As seen in FIGS. 3 and 4, a portion of the second surface 28b of the second member 28 is exposed to facilitate dissipating heat generated during a braking operation. The inner portion 24 is attached to or contacts the first surface 28a of the second member 28 such that the second surface 28b of the second member 28 is exposed to maximize the dissipation of heat. As seen in FIGS. 2 and 4, a portion of the first surface 28a of the second member 28 is exposed between areas in which the connecting arms 34 of the inner portion 24 radially overlap the second member 28 to further facilitate heat dissipation.

Figure 6:
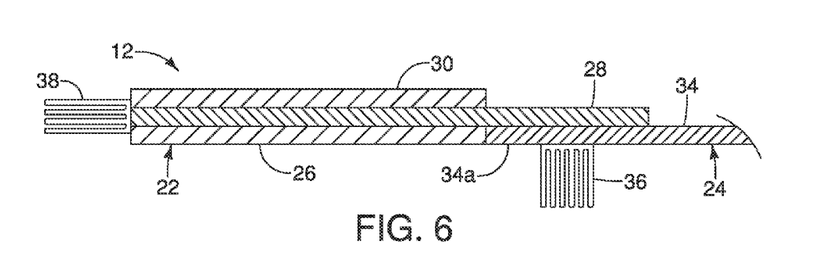
FIG. 6 is a cross sectional view of the bicycle disc brake rotor of FIG. 4 including a cooling fin.

As seen in FIG. 6, a first cooling fin 36 can be connected to the inner portion 24 to further facilitate heat dissipation. The first cooling fin 36 can be connected to the inner portion 24 at any suitable location, such as to the inner surface 34a of the connecting arm 34. The first cooling fin 36 can be connected to the inner portion 24 in any suitable manner, such as by bonding, welding, an adhesive or a mechanical fastener. A second cooling fin 38 can be connected to the second member 28 of the outer member 22. The second cooling fin can be connected to the second member 28 at any suitable location, such as an outer peripheral edge of the second member 28. The second cooling fin 38 can be connected in addition to, or in lieu of, the first cooling fin 36. The second cooling fin 38 can be connected to the outer portion 22 in any suitable manner, such as by bonding, welding, an adhesive or a mechanical fastener. The first and second cooling fins 36 and 38 are preferably formed as separate members from the outer portion 22 and the inner portion 24. The first and second cooling fins 36 and 38 are formed of a metallic material with corrosion resistant characteristics, such as an aluminum alloy, stainless steel or other suitable material. Preferably, the material of the first and second cooling fins 36 and 38 has a higher thermal conductivity than the outer portion 22.

As seen in FIG. 7, a bicycle disc brake rotor 112 in accordance with a second exemplary embodiment of the present invention is substantially similar to the bicycle disc brake rotor 12 of the first exemplary embodiment except for the differences described below. Similar parts are identified with similar reference numerals, except in the 100 series (i.e., 1xx).

The inner portion 124 is attached to the second member 128 of the outer portion 124 by a fastener 142. A fastener hole 128c is formed in the second member 128 and is aligned with a fastener hole 134c disposed in a connecting arm 134 of the inner portion 124. The second member fastener hole 128c extends from a first surface 128a of the second member 128 to a second surface 128b. The inner portion fastener hole 134 extends from a first surface 134a of the connecting arm 134 to a second surface 134b. A first head 142a of the fastener 142 engages the first surface 134a of the connecting arm 134 and a second head 142b of the fastener 142 engages the second surface 128b of the second member 128. The first and second heads 142a and 142b of the fastener 142 prevent removal of the fastener 142, thereby connecting the inner portion 124 to the outer portion 122. Although the fastener 142 is not shown engaging a third member 130 of the outer portion 122, the fastener 142 can engage the third member 130 in a configuration in which the third member 130 radially overlaps the inner portion 124 (as seen in FIG. 10, for example).

Figure 8:
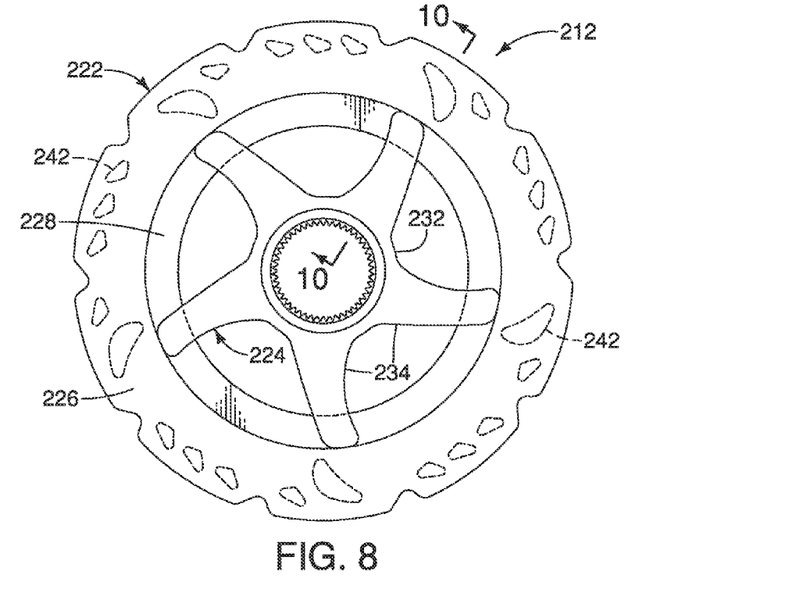
FIG. 8 is a side elevational view of a disc brake rotor in accordance with a third exemplary embodiment of the present invention.
Figure 9:
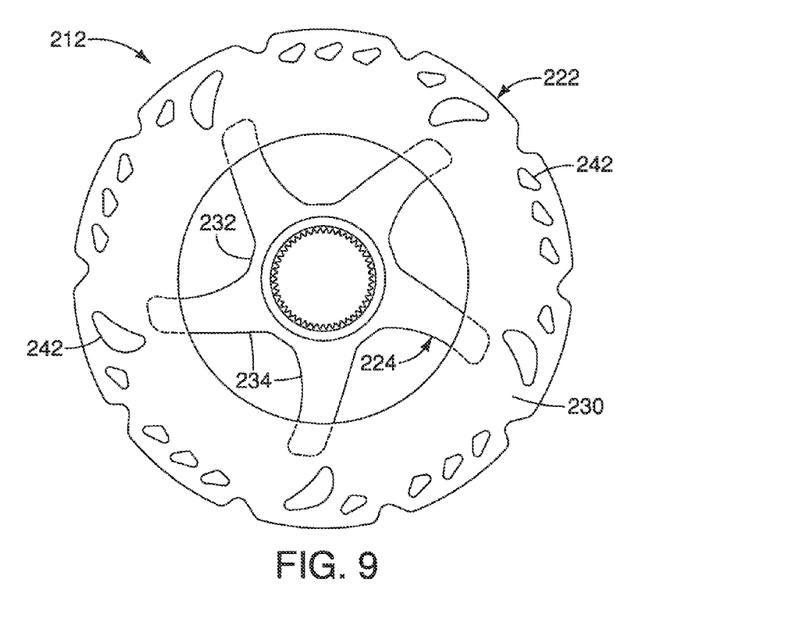
FIG. 9 is an opposite side elevational view of the disc brake rotor illustrated in FIG. 8.
Figure 10:
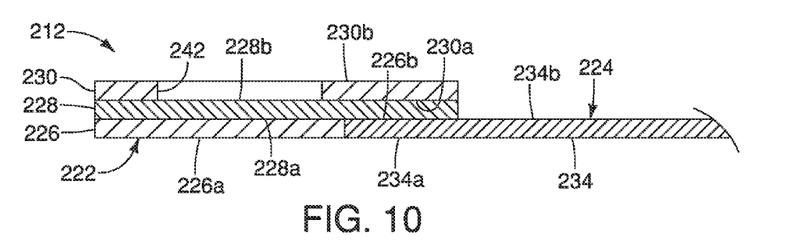
FIG. 10 is a cross sectional view of the bicycle disc brake rotor taken along line 10-10 of FIG. 8.

As seen in FIGS. 8-10, a bicycle disc brake rotor 212 in accordance with a third exemplary embodiment of the present invention is substantially similar to the bicycle disc brake rotor 12 of the first exemplary embodiment except for the differences described below. Similar parts are identified with similar reference numerals, except in the 200 series (i.e., 2xx).

A plurality of openings 242 are formed in the third member 230 to expose the second surface, or base surface, 228b of the second member 228. As seen in FIG. 10, the plurality of openings extend from the outer surface 230b of the third member 230 to the inner surface 230a, thereby exposing the second surface 228b of the second member 228 to facilitate heat dissipation. Any suitable number of openings 242 can be disposed in the third member 230. The plurality of openings 242 can have any suitable shape. Each of the plurality of openings 242 can have a similar shape or a different shape. As seen in FIGS. 8 and 10, a portion of the first surface 228a of the second member 228 is exposed between areas in which the connecting arms 234 of the inner portion 224 radially overlap the second member 228 to further facilitate heat dissipation.

The radial length of the third member 230 is substantially equal to a radial length of the second member 228, thereby improving the rigidity of the disc brake rotor 12. As seen in FIG. 10, the radial length of the third member 230 is longer than the radial length of the first member 226. The radial length of the second member 228 is longer than the radial length of the first member 226 to expose a portion of the first surface 228a of the second member 228.

Figure 11:
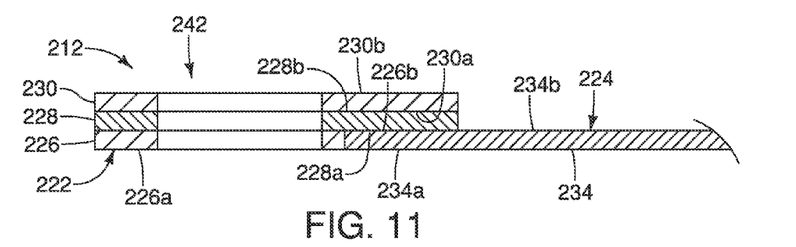
FIG. 11 is a cross sectional view of an alternative embodiment of the bicycle disc brake of FIG. 10.

In an alternative embodiment of the third exemplary embodiment, as seen in FIG. 1, the plurality of openings 242 extend entirely through the outer portion 222 of the bicycle disc brake rotor 212. The plurality of openings 242 extend from the first surface 226a of the first member 226 to the second surface 230b of the third member 230 such that each opening 242 passes entirely through each of the first, second and third members 226, 228 and 230. All other features of the alternative embodiment seen in FIG. 11 are substantially similar to the features described with reference to the third exemplary embodiment seen in FIGS. 8-10.

Figure 12:
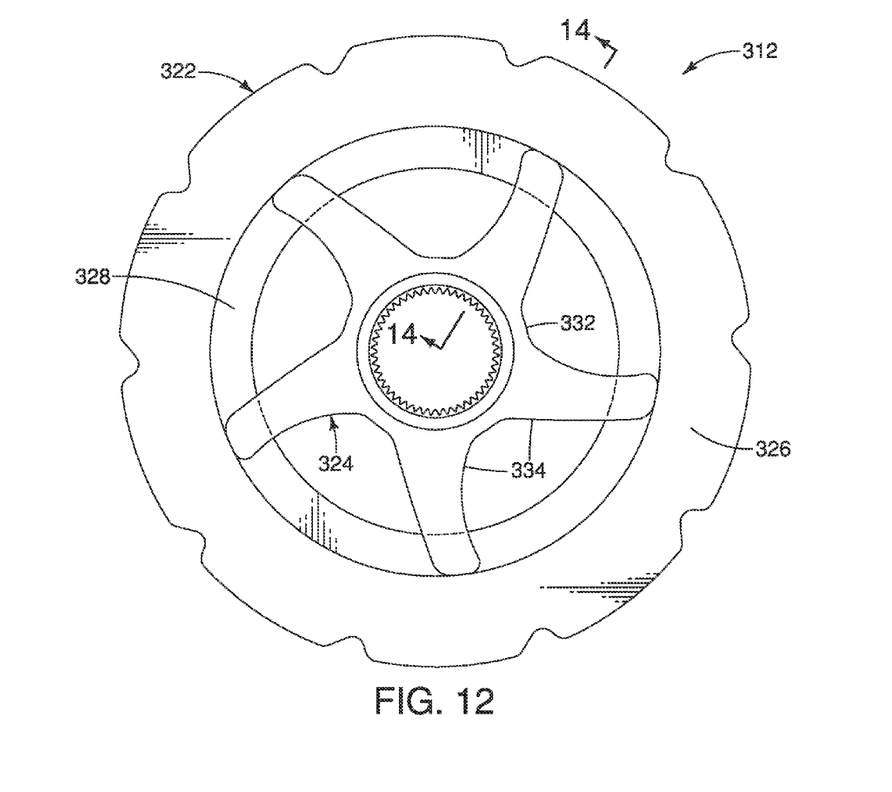
FIG. 12 is a side elevational view of the disc brake rotor in accordance with a fourth exemplary embodiment of the present invention.
Figure 13:
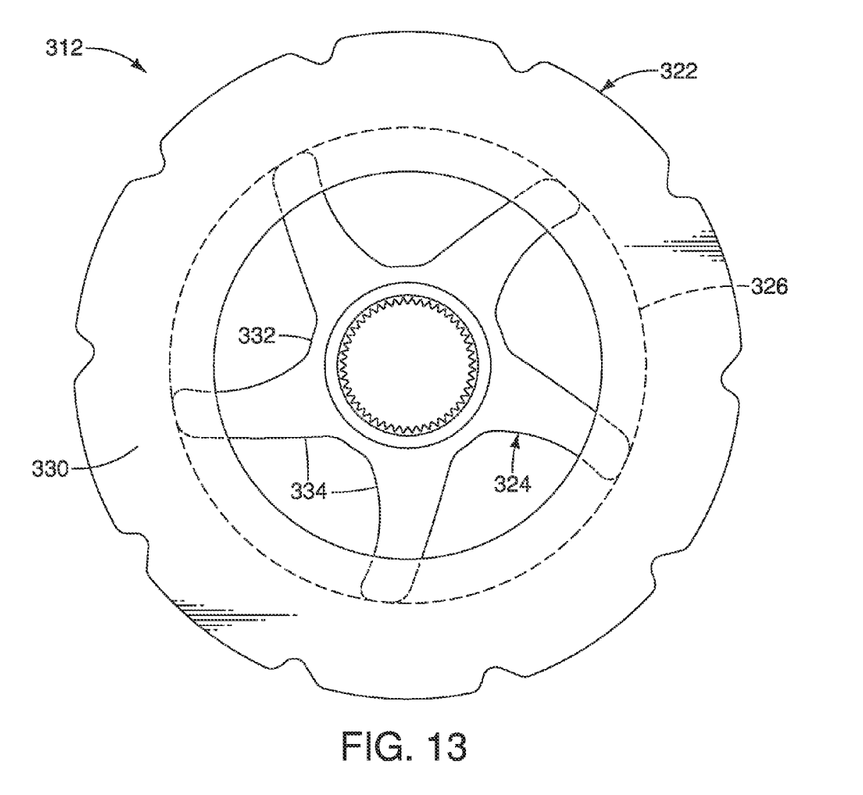
FIG. 13 is an opposite side elevational view of the disc brake rotor illustrated in FIG. 12.
Figure 14:
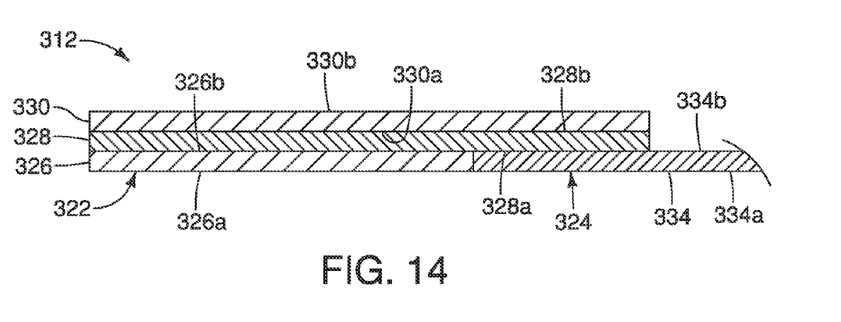
FIG. 14 is a cross sectional view of the bicycle disc brake rotor taken along line 14-14 of FIG. 12.

As seen in FIGS. 12-14, a bicycle disc brake rotor 312 in accordance with a fourth exemplary embodiment of the present invention is substantially similar to the bicycle disc brake rotor 212 of the third exemplary embodiment except for the differences described below. Similar parts are identified with similar reference numerals, except in the 300 series (i.e., 3xx).

A radial length of the third member 330 is substantially equal to a radial length of the second member 328, thereby improving the rigidity of the disc brake rotor 312. The radial length of the third member 330 is longer than a radial length of the first member 326. The radial length of the second member 328 is longer than a radial length of the first member 328 to expose a portion of the first surface 328a of the second member 328.

As seen in FIG. 13, the third member 330 does not have an opening to expose the second surface 328b of the second member 328. The first surface 328a of the second member 328 is exposed between areas in which the connecting arms 334 of the inner portion 324 radially overlap the second member 328 to facilitate dissipating heat.

Figure 15:
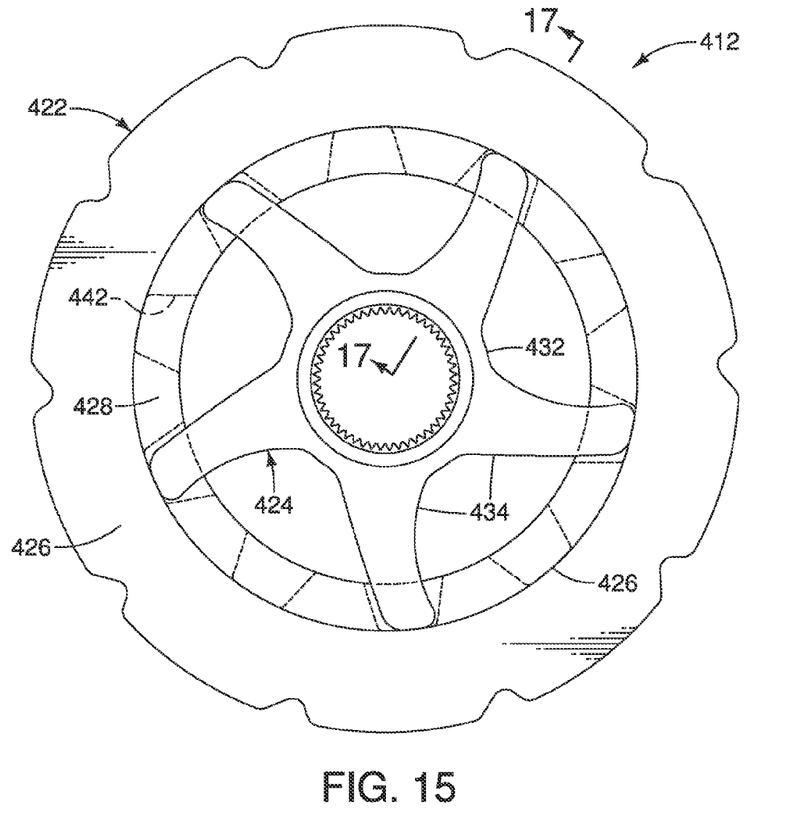
FIG. 15 is a side elevational view of the disc brake rotor in accordance with a fifth exemplary embodiment of the present invention.
Figure 16:
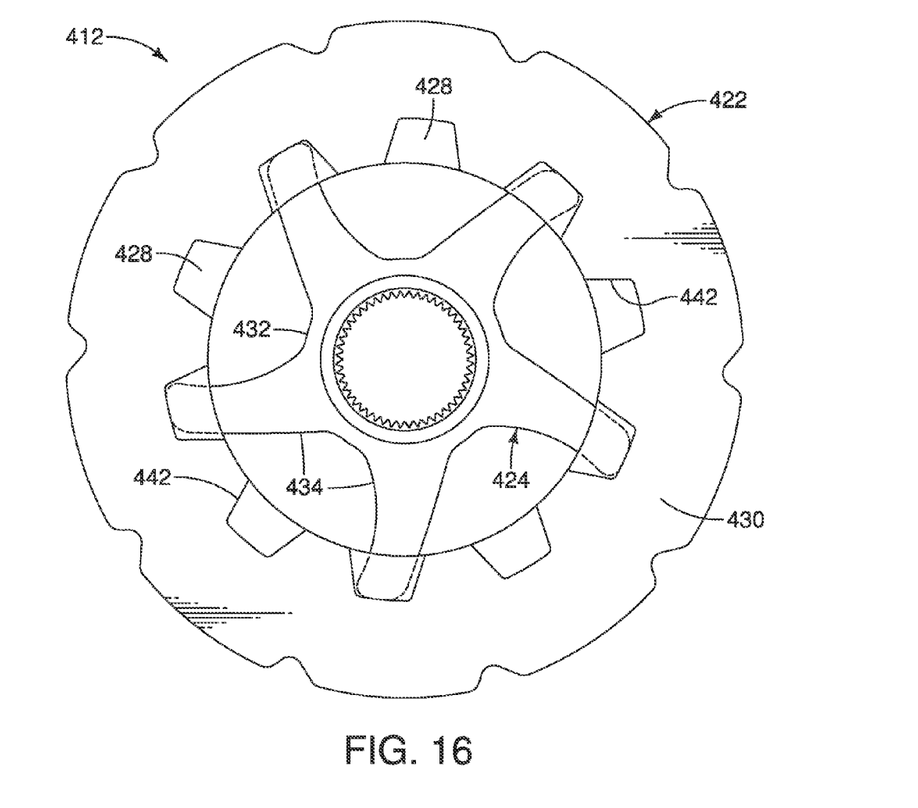
FIG. 16 is an opposite side elevational view of the disc brake rotor illustrated in FIG. 15.
Figure 17:
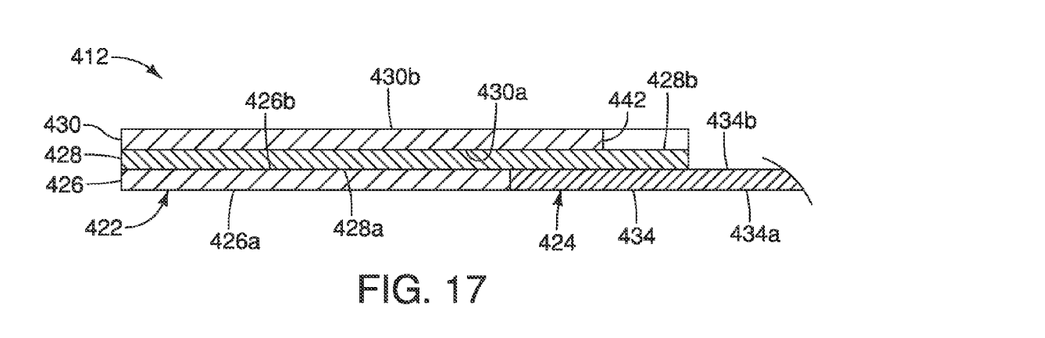
FIG. 17 is a cross sectional view of the bicycle disc brake rotor taken along line 17-17 of FIG. 15.

As seen in FIGS. 15-17, a bicycle disc brake rotor 412 in accordance with a fifth exemplary embodiment of the present invention is substantially similar to the bicycle disc brake rotor 212 of the third exemplary embodiment except for the differences described below. Similar parts are identified with similar reference numerals, except in the 400 series (i.e., 4xx).

A plurality of recessed portions 442 are formed in an inner peripheral edge of the third member 430 to expose a second surface, or base surface, 428b of the second member 428. Any suitable number of recessed portions 442 can be circumferentially disposed around the inner peripheral edge of the third member 430. The recessed portions 442 can have any suitable shape to facilitate exposing the second surface 428b of the second member 428. As seen in FIG. 16, the plurality of recessed portions 442 can have a similar shape. Alternatively, the plurality of recessed portions 442 can have a combination of different shapes.

The radial length of the third member 430 is substantially equal to a radial length of the second member 428, thereby improving the rigidity of the disc brake rotor 412. The radial length of the third member 430 is longer than a radial length of the first member 426. The radial length of the second member 428 is longer than a radial length of the first member 426 to expose a portion of the first surface 428a of the second member 428. The first surface 428a of the second member 428 is exposed between areas in which the connecting arms 424 radially overlap the second surface 428 to further facilitate heat dissipation.

Figure 18:
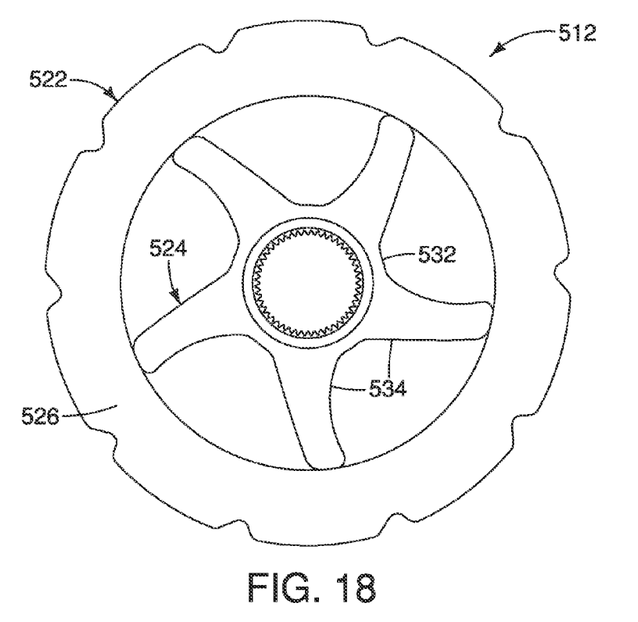
FIG. 18 is a side elevational view of a disc brake rotor in accordance with a sixth exemplary embodiment of the present invention.
Figure 19:
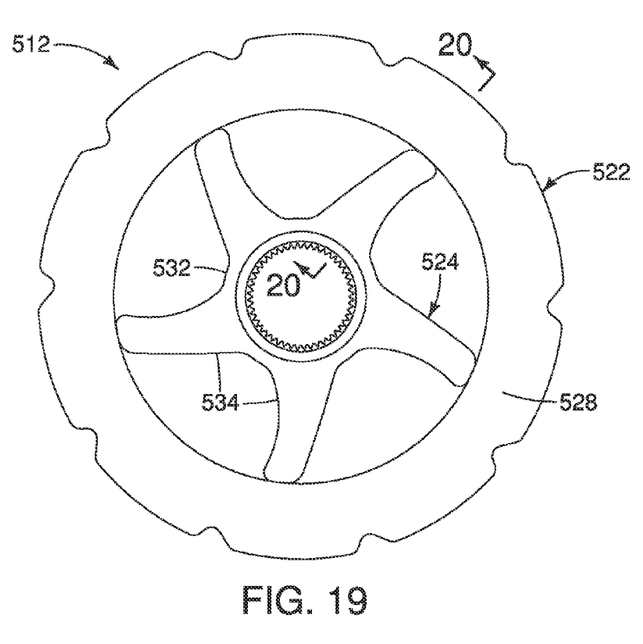
FIG. 19 is an opposite side elevational view of the disc brake rotor illustrated in FIG. 18.
Figure 20:
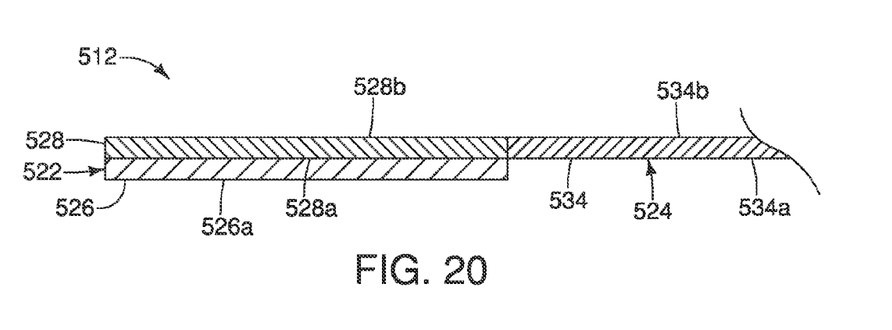
FIG. 20 is a cross sectional view of the bicycle disc brake rotor taken along line 20-20 of FIG. 18.

As seen in FIGS. 18-20, a bicycle disc brake rotor 512 in accordance with a sixth exemplary embodiment of the present invention is substantially similar to the bicycle disc brake rotor 12 of the first exemplary embodiment except for the differences described below. Similar parts are identified with similar reference numerals, except in the 500 series (i.e., 5xx).

The outer portion 522 only includes the first member 526 and the second member 528. The inner portion 524 is connected to the second member 528 of the outer portion 522. As seen in FIGS. 18-20, the inner portion 524 is connected to an inner peripheral edge of the second member 528. As described above, the inner portion 524 can be connected in any suitable manner to any suitable location of the second member 528. The outermost surfaces of the disc brake rotor 512 are the first surface 526a of the first member 526 and the second surface 528b of the second member 528, which form the first and second braking surfaces.

As seen in FIG. 20, a radial length of the first member 526 is substantially equal to a radial length of the second member 528. The inner portion 524 is axially spaced from the first member 526. The second surface 528b of the second member 528 is exposed to facilitate heat dissipation.

As used herein, directional terms, such as "inward" and "outward", as well as any other similar directional terms, refer to those directions of a device equipped with the present invention. Accordingly, these terms, as utilized to describe the present invention should be interpreted relative to a device equipped with the present invention.

The terms of degree, such as "substantially", as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the exemplary embodiments according to the present invention are provided for illustration only, and not for the purpose of limiting the invention as defined by the appended claims and their equivalents. Thus, the scope of the invention is not limited to the disclosed exemplary embodiments.

What is claimed is:

1. A bicycle disc brake rotor having a rotational center axis, the bicycle disc brake rotor comprising:
    an outer portion including a first member having a first thermal conductivity and a second member having a second thermal conductivity that is higher than the first thermal conductivity, the second member being attached to the first member, and
    an inner portion disposed radially inwardly from the outer portion with respect to the rotational center axis, the inner portion being a separate member from the first and second members, the inner portion being attached to the second member of the outer portion.

2. The bicycle disc brake rotor according to claim 1, wherein
    the outer portion further includes a third member, and
    the second member is attached to the third member and is disposed between the first member and the third member in an axial direction parallel to the rotational center axis.

3. The bicycle disc brake rotor according to claim 2, wherein
    a radial length of the first member is longer than a radial length of the third member.

4. The bicycle disc brake rotor according to claim 2, wherein
    the inner portion is axially spaced from the third member.

5. The bicycle disc brake rotor according to claim 2, wherein
    a plurality of openings are formed in the third member to expose a base surface of the second member.

6. The bicycle disc brake rotor according to claim 2, wherein
    a plurality of recessed portions are formed in an inner peripheral edge of the third member to expose a base surface of the second member.

7. The bicycle disc brake rotor according to claim 2, wherein
    a plurality of openings extend entirely through the outer portion.

8. The bicycle disc brake rotor according to claim 1, wherein
    the inner portion includes a hub attachment part configured to be attached to a bicycle hub assembly.

9. The bicycle disc brake rotor according to claim 8, wherein
    the inner portion includes at least one arm portion, the at least one arm portion extends radially outwardly from the hub attachment part to the outer portion with respect to the rotational center axis.

10. The bicycle disc brake rotor according to claim 9, wherein the at least one arm portion includes an attachment portion configured to be attached to the second member of the outer portion.

11. The bicycle disc brake rotor according to claim 1, wherein
a radial length of the second member is longer than a radial length of the first member.

12. The bicycle disc brake rotor according to claim 1, wherein
the inner portion is attached to the second member by at least one of the group consisting of bonding, welding, an adhesive and a mechanical fastener.

13. The bicycle disc brake rotor according to claim 1, wherein
a cooling fin is attached to the inner portion.

14. The bicycle disc brake rotor according to claim 1, wherein
a cooling fin is attached at least to the second member of the outer portion.

15. The bicycle disc brake rotor according to claim 1, wherein
the first member has a radial length substantially equal to a radial length of the second member.

16. A bicycle disc brake rotor having a rotational center axis, the bicycle disc brake rotor comprising:
an outer portion including a first member having a first thermal conductivity and a second member having a second thermal conductivity that is higher than the first thermal conductivity, the second member being attached to the first member, and
an inner portion disposed radially inwardly from the outer portion with respect to the rotational center axis, the inner portion being a separate member from the first and second members, the inner portion contacting the second member of the outer portion.

17. The bicycle disc brake rotor according to claim 16, wherein
the outer portion further includes a third member, and
the second member is attached to the third member and is disposed between the first member and the third member in an axial direction parallel to the rotational center axis.

18. The bicycle disc brake rotor according to claim 17, wherein
a plurality of openings are formed in the third member to expose a base surface of the second member.

19. The bicycle disc brake rotor according to claim 17, wherein
a plurality of openings extend entirely through the outer portion.

20. The bicycle disc brake rotor according to claim 17, wherein
a plurality of recessed portions are formed in an inner peripheral edge of the third member to expose a base surface of the second member.

21. The bicycle disc brake rotor according to claim 16, wherein
the inner portion includes a hub attachment part configured to be attached to a bicycle hub assembly.

22. The bicycle disc brake rotor according to claim 21, wherein
the inner portion includes at least one arm portion, the at least one arm portion extends radially outwardly from the hub attachment part to the outer portion with respect to the rotational center axis.

23. The bicycle disc brake rotor according to claim 22, wherein
the at least one arm portion includes an attachment area configured to be attached to the first member of the outer portion.

24. The bicycle disc brake rotor according to claim 16, wherein
the inner portion is attached to the first member of the outer portion.

25. The bicycle disc brake rotor according to claim 24, wherein
the inner portion is attached to the first member by at least one of the group consisting of bonding, welding and an adhesive.

26. The bicycle disc brake rotor according to claim 16, wherein
a radial length of the second member is longer than a radial length of the first member.

27. The bicycle disc brake rotor according to claim 16, wherein
a cooling fin is attached to the inner portion.

28. The bicycle disc brake rotor according to claim 16, wherein
a cooling fin is attached to at least the second member of the outer portion.

29. The bicycle disc brake rotor according to claim 16, wherein
the inner portion is axially spaced from the first member.

30. The bicycle disc brake rotor according to claim 16, wherein
the first member has a radial length substantially equal to a radial length of the second member.

* * * * *